FIELD IDENTIFICATION APPARATUS

Filed Nov. 21, 1951 3 Sheets-Sheet 1

INVENTOR
Allen A. Barco
BY
ATTORNEY

April 17, 1956 A. A. BARCO 2,742,527

FIELD IDENTIFICATION APPARATUS

Filed Nov. 21, 1951 3 Sheets-Sheet 2

INVENTOR
Allen A. Barco
BY [signature]
ATTORNEY

April 17, 1956 | A. A. BARCO | 2,742,527

FIELD IDENTIFICATION APPARATUS

Filed Nov. 21, 1951 | 3 Sheets-Sheet 3

INVENTOR
Allen A. Barco
BY
[signature]
ATTORNEY

United States Patent Office 2,742,527

Patented Apr. 17, 1956

2,742,527

FIELD IDENTIFICATION APPARATUS

Allen A. Barco, Princeton, N. J., assignor to Radio Corporation of America, a corporation of Delaware Application November 21, 1951, Serial No. 257,495

2 Claims. (Cl. 178—69.5)

This invention relates to apparatus adapted to sense whether odd line or even line fields of a television raster are to be scanned.

In accordance with present television practice a scene to be televised is scanned along a series of parallel lines during a first field and along a second series of lines that are interleaved with lines of the first field during a second or interlaced field. These alternate fields are sometimes referred to as the odd and even line fields and are separated by a vertical blanking interval during which the beam reverts to a position from which it can start scanning the next field. A color television system has been developed in which the intensity of a plurality of primary colors in a scene are successively analyzed or sampled in repeated sequence as each line of each field is scanned. Much improvement has been brought about in this color system by sampling the primary colors in one sequence during the first field and in a reverse sequence during a second field. In order that receivers that reproduce colors from their sampled signals may be standardized, the sampling at the transmitter must be controlled so that the primary colors are always sampled in a given sequence during the odd line fields and in the reverse sequence during the even line fields. The sampler itself may be comprised of a plurality of modulators, each of which is provided with alternating current carrier waves of different phases. Each carrier is modulated by the video signal representing a different primary color. If there are two or if there are three primary colors, a reversal in the sampling order can be brought about by interchanging the primary color signals applied to any two of the modulators or by interchanging the phases of the alternating current applied to any two of the modulators. This interchange of either color signals or carrier waves could for example be effected by a double pole double throw switch that is either mechanical or electronic. Whatever means is employed for actually bringing about the reversal in the color sampling sequence, it is apparent that it must be controlled so that it sets up the proper sequence for a field during the vertical blanking interval preceding it.

In accordance with one object of this invention an improved means is provided for deriving control voltages that are different from field to field.

As is well known to those skilled in the art, any switching action is apt to produce transients. If these transients occur at certain times in the vertical blanking interval, they can upset the normal operation of the transmitter. For example, in present television practice, certain portions of the televised signal are set so as to correspond to a given light level. These portions normally occur during the blanking intervals between lines and also during the blanking interval between fields. At several places in the transmitter, clamping circuits are employed to examine the signal during these portions of the signal having a known light level, and to adjust the signal level accordingly. If the transients referred to above occur during the portion of the signal to which the clamping circuits are responsive, it can be seen that the television signal during this portion would be different from that normally present and that the clamping circuits would adjust the signal level to the wrong value. Even though the transient may take place during only one of the clamping intervals, the clamping circuits may not resume normal operation until a considerable portion of the next field has been scanned. Receivers have no apparatus for determining that the transmitter is clamping at an incorrect level and consequently that the signals during the clamping intervals do not correspond to the same light level as before. Accordingly, they reproduce their images at incorrect light levels until the transmitter recovers from the effect of the transients.

It is therefore another object of the present invention to provide improved switching control voltage waves that effect phase sequence reversal at a time such that the transients produced will not interfere with the normal operation of the television transmitter.

In some previously suggested field sensing apparatus, the switching voltages are derived from a multivibrator that is triggered from one polarity into the other during alternate vertical blanking periods. During intermediate vertical blanking periods, the multivibrator changes polarity of its own accord. Due to variations in the operating characteristics of the multivibrator, this latter change in polarity sometimes occurs during the field scanning period rather than during the vertical blanking period.

It is therefore another object of the invention to provide an improved field sensing apparatus that is triggered to one polarity during one vertical blanking period, and triggered to another polarity during the next vertical blanking period.

Whereas some of the above objectives are of greatest importance in a television transmitter, there is one feature in the method of operation that is useful in other environments. To illustrate—in some apparatus a separate pulse is applied for each triggering action, but sometimes it is easier to derive two groups of pulses, a pulse of one group occurring during each triggering interval and a pulse of another group occurring during alternate triggering intervals. The pulses of one group may be used to trigger a multivibrator into one polarity and the pulse of the other may be employed to trigger the multivibrator into the other polarity. However, if a pulse from each group is present at the same time, one would nullify the other. Accordingly, means have been provided heretofore for preventing the unwanted pulse from reaching the multivibrator by blocking or clipping.

In accordance with this invention, the multivibrator is triggered from one polarity to the other in response to pulses similar to those described above without the need for preventing every other pulse of the first group from reaching the multivibrator. This is accomplished in accordance with one form of this invention by developing a desired pulse so that it occurs immedately following the undesired pulse. This is accomplished by "ringing" an oscillatory circuit of a "unique frequency" with the trailing edge of the last vertical sync pulse and the leading edge of the next equalizing pulse. During alternate scanning fields, the ringing occurs at the same time as the horizontal pulse and is added to it to produce a desired pulse which in turn occurs immediately after the vertical pulse or "undesired" pulse.

Figures 1, 2:
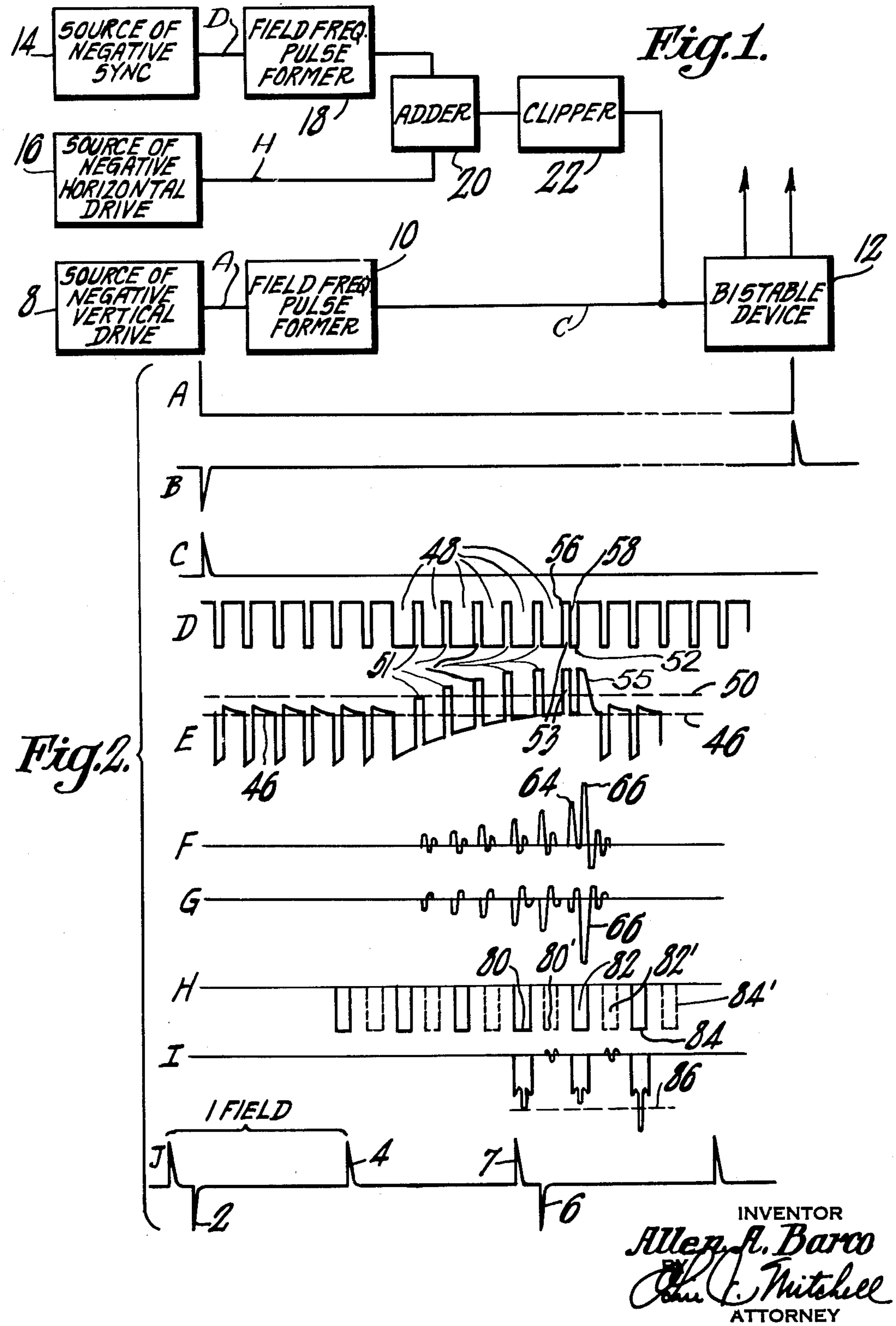
Figure 1 is a block diagram illustrating the manner in which one embodiment of this invention may function.
Figure 2 is a graph illustrating all the various types of wave forms to be found at different points in the arrangement of Figure 1.

Before proceeding with the detailed description of the apparatus for achieving the objectives of this invention a brief description of the desired overall operation will be given. Reference is made to the wave form "J" of Figure 2 wherein the positive pulses are shown as being spaced by a field interval. Immediately following alternate ones of the positive pulses are negative pulses. Each of the positive pulses may be applied to a bistable device so as to trigger it to one of the stable conditions and each negative pulse may be applied to the bistable device so as to trigger it to its other stable position. If the bistable device is triggered into one of its stable conditions by a negative pulse 2 it will stay in this condition until a positive pulse 4 triggers it to its other stable condition. This new condition will be maintained until it is again flipped over by the next negative pulse 6. The presence of the positive pulse 7 has no effect because the bistable device has already been triggered by the positive pulse 4 to the same stable state to which it would be triggered by the pulse 7. Therefore a positive pulse occurring during the same vertical blanking period as a negative pulse has no effect and therefore no apparatus is required to prevent them from reaching the bistable device. It will be understood that in other arrangements all of the pulses could be positive, the polarity depending on the type of the bistable device employed and the manner in which the pulses are coupled to it.

The general manner in which the pulses just described may be derived will now be explained in connection with the block diagram of Figure 1. In this particular embodiment of the invention, the pulses are to be derived from three different signals that are normally found in a standard sync generator. The positive pulses of field frequency are dervied by a pulse former 10 from the negative vertical drive signals supplied by a source 8 and are applied to a bistable device 12. The negative pulses that occur during alternate vertical blanking periods are derived from a negative sync signal supplied by a source 14 and the negative horizontal drive signals supplied by a source 16 in the following manner. Negative pulses of field frequency are developed at a given time in each vertical blanking period by pulse former 18 in response to the negative sync signals supplied by the source 14 and are applied to an adder 20. As is well known to those skilled in the art, the phase of the horizontal drive pulses supplied by the source 16 with respect to the vertical blanking interval changes on successive vertical blanking intervals. Therefore during alternate blanking intervals, the horizontal drive pulses may coincide with the pulses supplied by the pulse former 18. When this occurs, the adder produces a pulse of large amplitude which may be clipped by a clipping circuit 22 and supplied to the bistable device 12 in negative polarity. During intermediate vertical blanking intervals, when the horizontal drive pulses do not coincide with the pulses supplied by the pulse former 18, the pulses supplied by the adder 20 are not sufficient to overcome the bias of the clipper 22 and therefore no pulse is supplied to the bistable device 12. In this way the negative horizontal drive pulses supplied by the source 16 select every other field frequency pulse supplied by the pulse former 18 so as to provide pulses during alternate blanking intervals to the bistable device 12. These pulses are the negative pulses of wave form "J."

Figure 3:
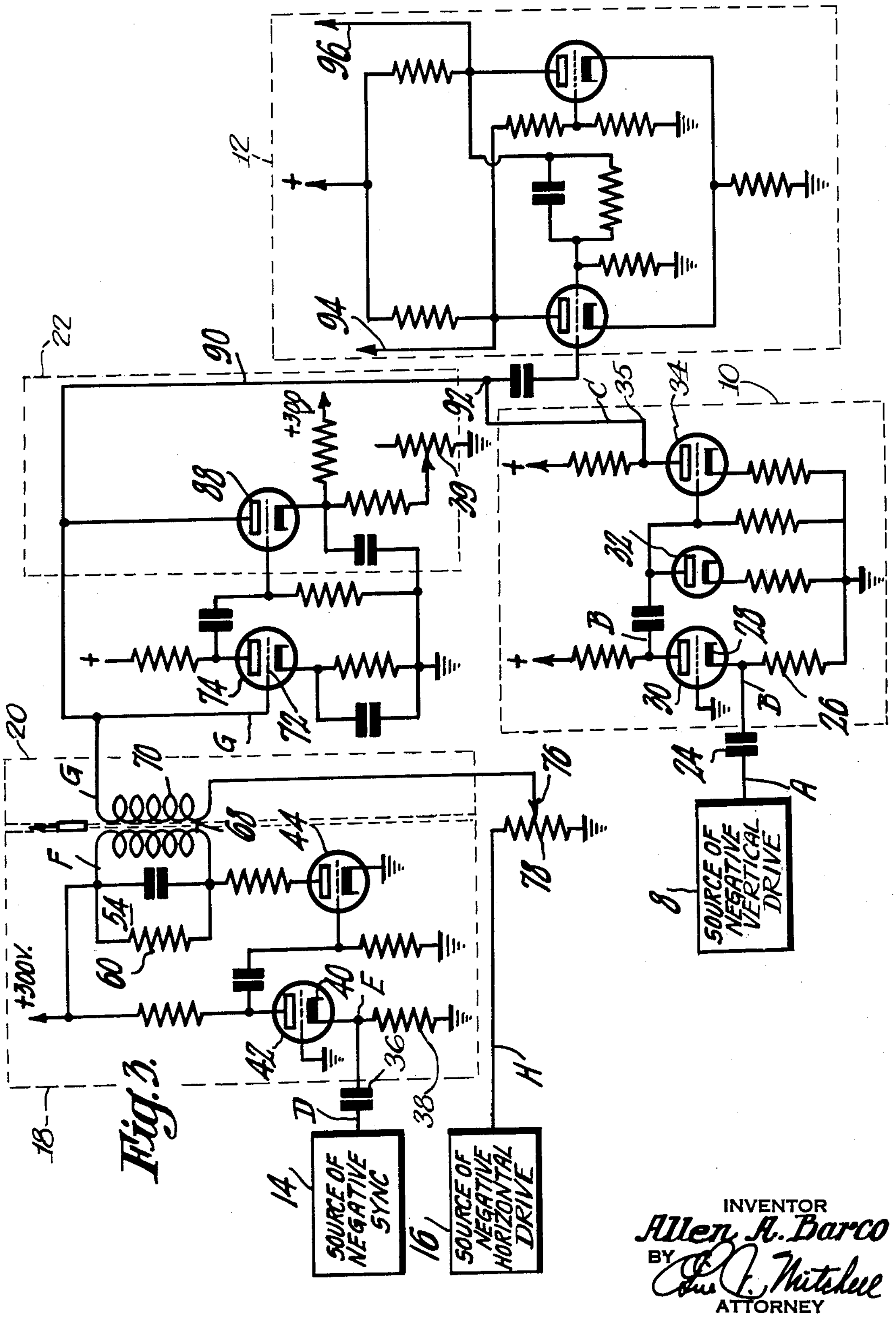
Figure 3 is a schematic diagram of one embodiment of this invention.

Details of the various pulse forms of Figure 1 will now be discussed in connection with the schematic diagram of Figure 3 and the waves illustrated in Figure 2. The waves are indicated by the same letters that designate the point in the circuit at which they occur. Sections of the circuit of Figure 3 which roughly correspond to some of the blocks of Figure 1 have been enclosed in dashed line boxes and correspondingly numbered. The field frequency pulse former 10 may be constructed as follows. The negative vertical drive pulses "A" are applied to a condenser 24 and resistor 26 connected in series. The values of the condenser 24 and resistor 26 are such as to sharply differentiate the drive pulses "A" and produce a wave "B" across the resistor 26. Because the resistor 26 is connected between a cathode 28 of a grounded grid amplifier 30 and ground, the wave "B" appears at the plate of the grounded grid amplifier 30 in the same polarity but with increased amplitude. The positive pulses that are formed by the differentiation action at the trailing edge of the negative vertical drive pulses "A" are conducted to ground by a unilateral conducting device 32. Thus only the negative pulses of the wave "B" are applied to the grid of an amplifier 34. These pulses are inverted by amplifier 34 and appear as the desired positive field frequency pulse "C" at the plate thereof. The plate of amplifier 34 is connected to the input of the bistable device 12 by a lead 35 in such manner that the pulses "C" tend to trigger it to one of its stable conditions.

The following discussion relates to the details of the blocks 18, 20 and 22 of Figure 1. The negative sync signals "D" from source 14 are applied to a condenser 36 that is connected in series with a resistor 38. The values of the condenser 36 and resistor 38 are such as to slightly differentiate the negative sync signals and produce the wave "E" across the resistor 38. The resistor 38 is connected between the cathode 40 of a grounded grid amplifier 42 and ground, and the wave "E" therefore appears at the plate of the grounded grid amplifier with its polarity unchanged. The plate of the grounded grid amplifier 42 is coupled to the grid of an amplifier 44 so that the wave "E" is applied to the grid of the amplifier 44 and develops a grid bias at a level indicated by the dotted line 46. It will be noted that the differentiation of the negative sync signal "D" increases its amplitude in the region of the vertical sync signals 48. The dashed line 50 indicates the cut-off level of the amplifier 44. Therefore, only those of the now positive serrations 51 which are more positive than the cut-off level 50, the trough 53, and the portion above cut-off of pulse 55 produced by the differentiation process at the trailing edge of the equalizing pulse 52 cause the amplifier 44 to conduct. A tuned circuit 54 is connected to the plate of the amplifier 44 and is adjusted to resonate in the region of the second harmonic of the frequency having a half cycle equal to the time between the trailing edge 56 of the last vertical sync pulse 48 and the leading edge 58 of the equalizing pulse 52. A resistor 60 is placed in parallel with the tuned circuit so as to cause any oscillations to be damped out before it is energized again. These oscillations, as shown in wave "F," increase in amplitude owing to the fact that some of the pulses 51 cause them to exceed the dotted line 50 by greater and greater amounts. The pulse 53 of the wave form "E" produces oscillations in the tuned circuit 54 as do the pulses 51. However, the pulse 55 reinforces these oscillations so as to greatly increase their amplitude, the most positive crest being indicated by the numeral 66. The inductive member 68 of the tuned circuit 54 is magnetically coupled to a coil 70 and the polarization of the coil is such that the wave form "F" is inverted in polarity and appears as wave form "G" at the grid 72 of an amplifier 74. The lower end of the coil 70 is connected to movable tap 76 of a potentiometer 78. The lower end of the potentiometer is grounded and the upper end is connected to the source 16 of negative horizontal drive pulses "H."

During one vertical blanking period, the horizontal drive pulses 80, 82 and 84 shown in solid lines of wave "H," are supplied by the source 16 to the potentiometer 78, and during the next vertical blanking period, the horizontal drive pulses 80′, 82′ and 84′, shown in dotted lines, are supplied to the potentiometer 78 from the source 16. Because the pulse 66 is greater in amplitude, for reasons given above, than any of the other pulses supplied by the tuned circuit 54 it can be separated from them by a clipper 88 that is cathode biased by a potentiometer 39 at a level indicated by the dotted line 86. The pulses 66 which have been clipped are conducted by a lead 90 to a junction 92 with the lead 35. The junction 92 is coupled by a condenser to one side of a bistable multivibrator 12. The bistable multivibrator is triggered to one polarity by a negative pulse supplied by the lead 90 and to the other polarity by a positive pulse supplied by the lead 35. One output of the multivibrator is connected to a lead 94 and an oppositely polarized output is connected to a lead 96.

One of the objectives of the present invention is to produce switching voltages that occur at such times as not to interfere with the clamping action at the transmitter. The clamping action takes place after each pulse in a composite sync signal. By proper tuning of the tuned circuit 54, the exact position of the maximum pulse 66 can be shifted to some extent so that it occurs before the clamping action takes place.

Figure 4:
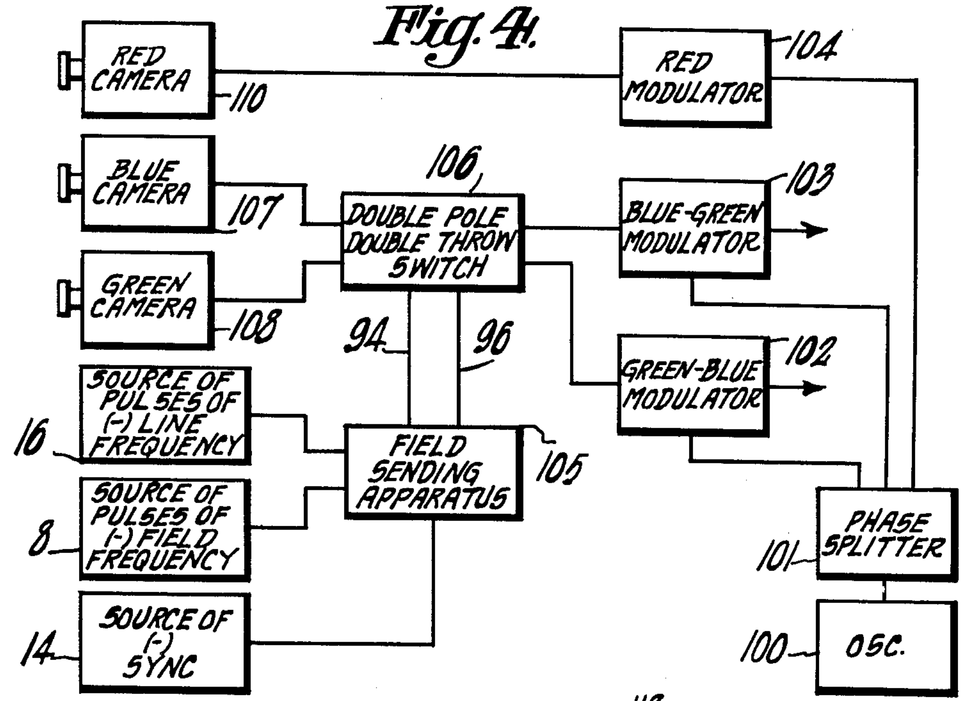
Figure 4 illustrates the application of the invention to a transmitter in which the sampling order is reversed by interchanging two video signals.

Figure 4 illustrates the application of the field sensing apparatus of this invention to a color television transmitter in which it is desired to reverse the sampling sequence at field rate. An oscillator 100 supplies sampling frequency to a phase splitter 101 which in turn supplies different phases of the sampling frequency to modulators 102, 103 and 104. The field sensing apparatus is included in the rectangle 105 and the output leads 94 and 96 thereof are coupled to a double pole double throw switch 106. Two pickup tubes 107 and 108 that may furnish blue and green video signals respectively are coupled to the input terminals of the double pole double throw switch and the modulators 103 and 102 are coupled to the output terminals. Thus whenever the bistable device 12 of Figures 1 and 3 reverses polarity, the double pole double throw switch 106 is activated so as to interchange the connection between the pickup tubes 107 and 108 at the modulators 103 and 102. A third color is supplied by a pickup tube 110 directly to the modulator 104.

Figure 5:
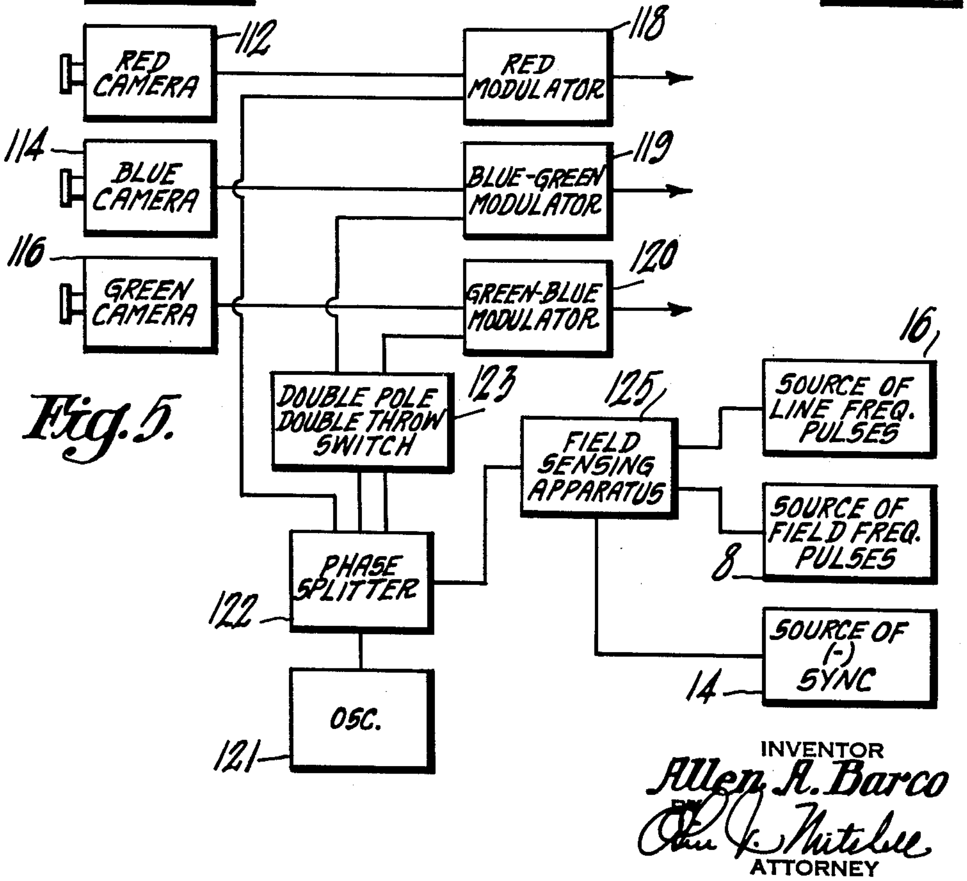
Figure 5 illustrates the application of the invention to a transmitter in which the sampling order is reversed by interchanging two of the differently phased subcarriers applied to the modulators.

Figure 5 illustrates the manner in which the present invention may be used in a color television transmitter wherein reversal in the sampling signals of the different primary colors is to be effected by interchanging the phases of the sampling carrier supplied to the sampling modulators. Pickup tubes 112, 114 and 116 supply red, green and blue video signals respectively to modulators 118, 119 and 120. As oscillator 121 of sampling frequency is coupled to a phase splitter 122. One of the differentiated outputs of the phase splitter is coupled directly to the modulator 118 where it is amplitude modulated by the third video signal. The other two differently phased outputs of the phase splitter 102 are coupled to the input terminals of the double pole double throw switch 123. The output terminals of the switch are coupled to the modulators 119 and 120. The field sensing apparatus 125 of this invention operates the double pole double throw switch 123 at field rate so as to interchange the phases of the sampling frequency applied to the modulators 119 and 120.

What is claimed is:

1. Field sensing apparatus comprising in combination means adapted to differentiate vertical drive pulses, means for selecting the pulse produced by said differentiating means in response to the leading edge of said vertical drive pulse, a bistable device means for triggering said device into one stable condition in response to said selected pulses, means for deriving an emphasized ringing oscillation in response to a given portion of composite sync, means for combining interlaced line frequency pulses with said emphasized ringing oscillation, a normally cut off gating device, means for applying said combined pulses to said gating device in such polarity as to tend to casue it to conduct, said gating device being so biased that only the simultaneous presence of both the line frequency pulse and said ringing oscillation render it capable of passing signals, an integrating network coupled to the output of said gating device, and means for applying the pulses passed by said gating device through said integrating network to said bistable device in such manner as to trigger it to its other stable condition.

2. Field sensing apparatus for use in television apparatus wherein a unique frequency signal appears at one point in the synchronizing wave during the vertical blanking period between fields and wherein line synchronizing pulses occur at the same time as said unique frequency signal in one vertical blanking period and at a different time than said unique frequency signal in a succeeding vertical blanking period and wherein pulses of field frequency are available that have their leading edges occurring before the occurrence of said unique frequency signal, said field sensing apparatus comprising in combination means for deriving a first pulse of one polarity in response to the leading edge of said field frequency pulses, a resonant circuit means having a resonant frequency at substantially said unique frequency to develop at least a unique frequency pulse from said unique frequency signal, means for deriving a second pulse of the opposite polarity to said first pulse in response to the coincidence of said line frequency pulses and said unique frequency pulse, and a bistable device adapted to be triggered to one stable state by said first pulse and to another stable state by said second pulse.

References Cited in the file of this patent

UNITED STATES PATENTS

| | | |
|---|---|---|
| 2,535,247 | White | Dec. 26, 1950 |
| 2,539,440 | Labin | Jan. 30, 1951 |
| 2,546,972 | Chatterjea | Apr. 3, 1951 |
| 2,558,489 | Kalfaian | June 26, 1951 |
| 2,580,903 | Evans | Jan. 1, 1952 |
| 2,611,033 | Jones | Sept. 16, 1952 |